Jan. 6, 1959     Q. CHIAPPINELLI, JR     2,867,022

CUFF LINK

Filed June 13, 1957

INVENTOR.
Quirino Chiappinelli, Jr,
BY
Barlow & Barlow
ATTORNEYS.

United States Patent Office 2,867,022
Patented Jan. 6, 1959

2,867,022
CUFF LINK

Quirino Chiappinelli, Jr., Cranston, R. I., assignor to Federal Findings Co., Inc., a corporation of Rhode Island Application June 13, 1957, Serial No. 665,391

5 Claims. (Cl. 24—41)

This invention relates to a cuff link of the type in which one of the heads of the link may be bent to be passed through the button holes of the cuff.

An object of the invention is to provide a cuff link of the above type wherein one of the heads thereof will be constructed in such a way as to be bendable upon itself to allow the passing thereof through the button holes of the cuff.

A more specific object of the invention is to employ wire helically coiled in springlike fashion for a head of the cuff link.

With these and other objects in view, the invention consists of certain novel features of construction, as will be more fully described and particularly pointed out in the appended claims.

Figure 1:
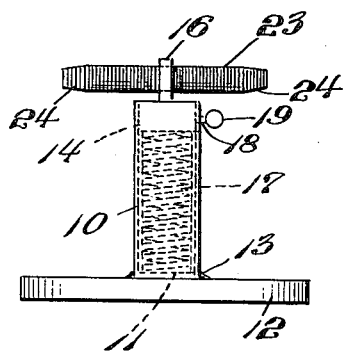
Fig. 1 is a side elevational view of a cuff link embodying my invention.
Figure 2:
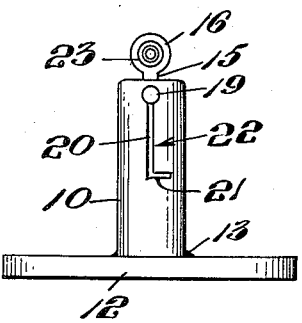
Fig. 2 is an edge view of the cuff link shown in Fig. 1.
Figure 3:
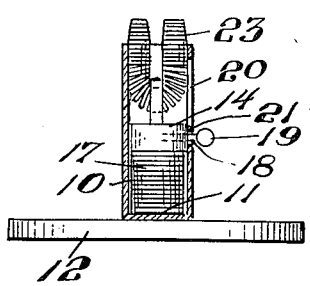
Fig. 3 is a view partially in section of the cuff link of Fig. 1 showing the head in collapsed relation.

The cuff link shown in Figs. 1 to 3 comprises a tubular shank 10 closed at one end by a wall 11 and open at the other end. An enlarged head 12 is secured to the closed end of the shank by means of solder as at 13. A plunger 14, having a flat stem 15 extending axially therefrom, terminates in a circular enlargement 16, the plunger being slidably received in the shank 10. A coil compression spring 17 is arranged within the shank with one end thereof acting against the plunger 14 so as to urge or bias the same for outward movement. A pin 18 having an enlarged head 19 projects radially from the plunger 14 to pass through a slot 20 in the wall of the shank 10. The slot 20 extends inwardly from adjacent the open end of the shank axially thereof and joins with a traversely extending slot 21 (see Fig. 2) to form therewith a so-called bayonet slot designated generally 22. The outer end of the slot 20 provides an abutment to be engaged by the pin 18 so as to limit the outward movement of plunger 14. The plunger 14 may be moved inwardly against the pressure of spring 17 by sliding the pin inwardly and may be locked in the inner position thereof by moving the pin to engage in the slot 21.

The enlargement 16 is pierced to tightly receive an elongated tubular head 23 which is made of resilient wire tightly coiled in springlike fashion and with each end portion 24 tapered as shown. The head 23 projects equal distances on opposite sides of the enlargement 16. As previously mentioned, the head 23 is made of resilient wire and will readily yield to bend back upon itself and will recover upon being free of the force bending the same. In order to readily pass the head 23 through the button holes of a cuff, the pin 18 is moved inwardly carrying the head 23 therewith which upon being engaged by the edge about the open end of the shank will bend in U-shape as seen in Fig. 3 to be carried inwardly of the shank 10. The head may be locked in the relation shown in Fig. 3 by engaging the pin 18 in the lateral portion 21 of the bayonet slot. In this relation of the head 23, the same may be easily passed through the said button holes and then released by disengaging the pin with slot 21 whereupon the pressure of spring 17 will return the plunger to initial position and the head 23 will recover to the normal condition thereof.

Figure 4:
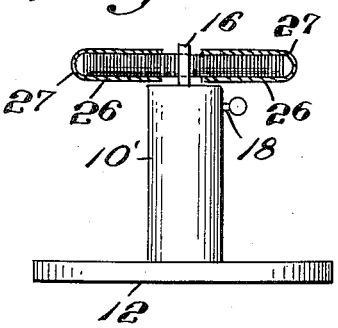
Fig. 4 is a view similar to Fig. 1 but with the elongated head thereof provided with ornamental sleeves.
Figure 5:
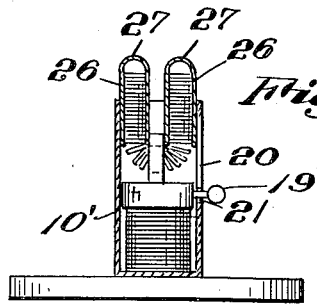
Fig. 5 is a view partially in section of the cuff link of Fig. 4 showing the elongated head thereof in collapsed relation.

The head 23 is made of wire and its tapered end portions 24 provide not only a novel appearance but have aesthetical appeal. In some instances, however, it may be desirable to ornament the head 16 and, as by way of example, tubular sleeves 26 may be tightly inserted on the head 23 as shown in Figs. 4 and 5. The sleeves 26 may be circular in cross section and have rounded ends 27 as shown. The sleeves, however, may be of other cross section shape than that above-mentioned. The spacing of the inner end of the sleeves 26 to the enlargement 16 should be such as to allow a sufficient number of coils at opposite sides of enlargement 16 to flex into the U-shape as seen in Fig. 5, thus allowing the sleeves 26 to be drawn into the shank 10' and the head to be passed through the button holes of the cuff in a way previously described.

Figure 6:
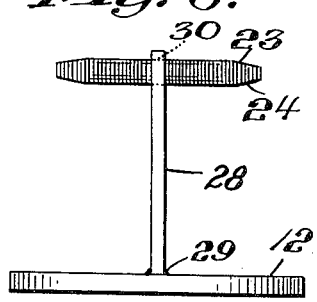
Fig. 6 is a side elevational view of a modified construction of cuff link.
Figure 7:
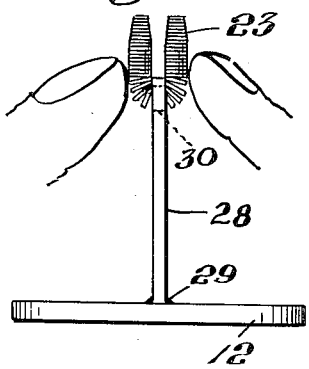
Fig. 7 is a similar view but showing the elongated head thereof bent back upon itself in position to be inserted through the button holes of the cuff.

In Figs. 6 and 7, I have shown a modified structure of cuff link in which the shank 28 is made of flat material and the head 12 is secured thereto at one end thereof as at 29 by solder. The other end of the shank is pierced as at 30 to receive the head 23 in tight relation therewith. As indicated in Fig. 7, the head 23 may be bent back upon itself into a U-shape by squeezing the head between the thumb and finger, whereupon said head may be easily passed through the button holes of the cuff.

From the above description, it will be apparent that I have disclosed a cuff link having a head which is resilient throughout its entire length and which may be bent into U-shape for passing through the button holes of a cuff and which will recover to normal condition thereof upon release of the force bending the same.

I claim:

1. A cuff link comprising a head, a shank portion extending it generally perpendicular to the plane of said head and affixed thereto, a second head mounted at the free end of said shank, said second head comprising an elongated flexible tube with the axis of said tube normally extending perpendicular to the axis of said shank whereby said second head may be flexed transversely of the axis thereof to extend generally parallel to the axis of said shank.

2. A cuff link as set forth in claim 1 wherein said second head is a helical coiled wire.

3. A cuff link as set forth in claim 1 wherein said second head extends at equal distances at opposite sides of said shank portion.

4. A cuff link comprising a head, a tubular shank portion extending generally at right angles to said head and secured thereto, a spring pressed plunger within said shank, an elongated second head secured to said plunger to move therewith, said second head normally extending outwardly of said shank at right angles thereto, said second head being flexible transversely of the axis thereof whereupon moving said plunger inwardly against the said spring pressure said second head will move into engagement with said shank and flex transversely of the axis thereof to be carried within said shank.

5. A cuff link as set forth in claim 4 wherein said shank has a bayonet slot in the wall thereof and a pin projects from said plunger through said slot so as to provide a handle for moving said plunger against the spring force acting thereon.

References Cited in the file of this patent

UNITED STATES PATENTS

| | | |
|---|---|---|
| 1,375,581 | Fontaine | Apr. 19, 1921 |

FOREIGN PATENTS

| | | |
|---|---|---|
| 1,070 | Great Britain | Jan. 21, 1891 |
| 445,743 | Germany | June 14, 1927 |
| 1,012,243 | France | Apr. 9, 1952 |